United States Patent
Fisher, Jr.

[15] 3,704,664
[45] Dec. 5, 1972

[54] APPARATUS FOR FORMING SWISS ROLLS

[72] Inventor: Alvert W. Fisher, Jr., Chattanooga, Tenn.

[73] Assignee: McKee Baking Company, Collegedale, Tenn.

[22] Filed: Aug. 10, 1971

[21] Appl. No.: 170,429

[52] U.S. Cl..................................99/450.2, 425/321
[51] Int. Cl.................................................A21c 3/06
[58] Field of Search....99/450.1, 450.2, 450.3, 450.4, 99/450.5, 450.6, 450.7, 450.8; 425/319–320, 321–322, 391–392, 393–394, 106

[56] References Cited

UNITED STATES PATENTS

| | | | |
|---|---|---|---|
| 2,450,033 | 9/1948 | Cohen | 425/391 X |
| 2,577,925 | 12/1951 | Sternbach | 99/450.2 |
| 2,642,012 | 6/1953 | Sticelber | 425/320 |
| 2,677,334 | 5/1954 | Hansen | 425/322 X |
| 3,167,032 | 1/1965 | Rhodes | 425/106 |
| 3,225,717 | 12/1965 | Page | 425/320 X |

Primary Examiner—Peter Feldman
Assistant Examiner—Arthur O. Henderson
Attorney—Roylance, Abrams, Berdo & Kaul

[57] ABSTRACT

Apparatus for making Swiss Rolls by feeding the coated dough sheets forwardly on a lower conveyor, tilting the rear end of the dough sheets upwardly, and contacting the tilted rear end against a forwardly moving upper conveyor. The upper conveyor moves faster than the lower conveyor, thus curling the dough sheet forwardly to form a Swiss Roll.

5 Claims, 1 Drawing Figure

PATENTED DEC 5 1972
3,704,664
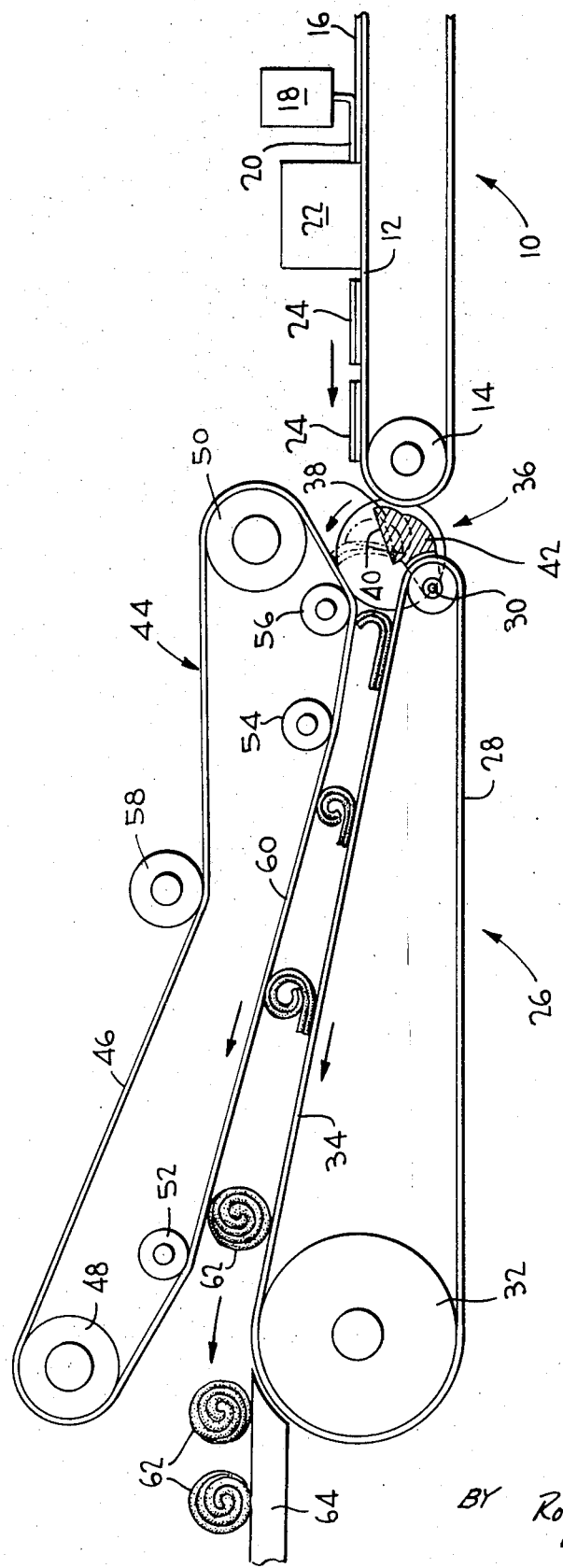
INVENTOR.
ALBERT W. FISHER, JR.
BY Roylance, Abrams, Berdo & Kaul
ATTORNEYS

APPARATUS FOR FORMING SWISS ROLLS

This invention relates to apparatus for mechanically producing pastry products and more particularly it relates to apparatus for producing and forming curled pastry products which are known commonly as Swiss Rolls.

The curled pastry product known as a Swiss Roll consists of a layer of dough with a layer of creme filling placed thereupon, the dough layer and the creme layer then being convolutely coiled or rolled to form a finished product. If desired, this finished product can be coated with an icing layer.

Such Swiss Roll products have customarily been produced manually, usually through the efforts of an assembly line of workers who digitally manipulated the creme coated dough layers to form the Swiss Rolls. While this procedure was operative, it did have certain drawbacks. One such drawback resided in the fact that there was a continual potential for health problems since the Swiss Roll products were being formed manually. Another drawback resided in the fact that the speed of hand manufacture was quite slow. Still another drawback resided in the fact that many employees had to be performing such manual operations in order to get a satisfactory quantity output, which meant that the wages paid to all of these employees had to be calculated into the cost of the Swiss Roll products.

More recently, it has been suggested that the manufacture of Swiss Rolls could be mechanized so that they could be manufactured automatically by a machine and so that manual operations would be kept to a minimum. Two recent patents are exemplary of these types of mechanized Swiss Roll formers, namely, U.S. Pat. No. 3,172,372 and U.S. Pat. No. 3,342,144. In both of these patents, the creme coated dough for the Swiss Roll is fed forwardly on a conveyor and the apparatus engages one side of the dough and rolls the same laterally.

It is an object of the present invention to provide, a new and improved apparatus for forming Swiss Rolls.

Another object of the present invention is to provide an apparatus for forming Swiss Rolls wherein the rolls are formed automatically through mechanized equipment, and wherein manual manipulations are eliminated or materially reduced.

Another object of the present invention is to provide a Swiss Roll forming machine wherein no undesired components of force or stress are exerted upon the dough products.

Other objects, advantages and salient features of the present invention will become apparent from the following detailed description, which, taken in conjunction with the annexed drawings, discloses a preferred embodiment of the present invention.

The foregoing objects are attained generally in providing a means for forming a plurality of discrete dough sheets, each having a creme coating on the upper surface thereof. These dough sheets are fed across a lifting means and onto a forwardly moving lower conveyor. The lifting means lifts the rear or tail end of the coated sheet upwardly to contact the same against a forwardly moving upper conveyor, whose speed is approximately three times the speed of the lower conveyor. Because of this difference in speed between the lower or transporting conveyor and the upper or curling conveyor, the coated dough sheet is rolled in a forward direction, even as it is being transported in a forward direction, to thereby form the curled pastry product known as a Swiss Roll.

Referring now to the drawings, which form a part of this original disclosure, the sole FIGURE thereof discloses a diagrammatic view of a Swiss Roll forming apparatus in accordance with the principles of the present invention.

Referring now to the drawing in greater detail, there is illustrated a first transporting or conveying means generally designated 10 which consists of an endless conveyor belt 12 trained over a drive roll 14 and a similar drive roll, not illustrated. A flat sheet of dough 16 is formed by any conventional dough forming apparatus and is carried forwardly on the endless conveyor 12. The dough 16 passes under a creme coater 18 which deposits a creme layer 20 on top of the dough layer 16. The creme coated dough layer then passes through a conventional cutting and separating means 22 which laterally slices the creme coated dough layer and separates the same into spaced discrete dough sheets, each having a creme coating on the upper surface thereof. Such creme coated dough sheets are designated 24.

Adjacent the conveyor 10 is another supporting and conveying means generally designated 26 which is formed by an endless conveyor belt 28 trained over a small roll 30 and a larger roll 32 so that the upper run 34 of the conveyor is inclined upwardly.

Adjacent the lower end of the conveyor 28, between the small roller 30 and the roller 14 for the adjacent conveyor 12, there is provided a means generally designated 36 for lifting the rear end of the sheets 24 as said sheets are conveyed forwardly. This means 36 includes a transversely extending bar member having an upper segment 38 with a flat surface 40 thereon, the surface serving to support the sheets 24 as they are transferred from the conveyor 12 to the conveyor 28. The means 36 also includes a lower portion 42 which is pivotally mounted to enable the means 36 to rotate in an upward direction. The rotation of the means 36 is in timed conjunction with the operation of the dough cutting means 22 and is such that the upward rotation starts as the rear or tail end of a dough sheet 24 is resting upon the surface 40.

An upper or curling conveyor generally designated 44 is provided in spaced juxtaposition above the conveyor 26. The conveyor 44 consists of an endless belt 46 trained over a pair of main rolls 48, 50 and a series of lower secondary rolls 52, 54 and 56. A tensioning roll 58 presses against the upper run of the belt 46 while the lower run 60 thereof extends in generally spaced relation above the upper run 34 of the conveyor 26. The speed of the upper conveyor 44 is 2.5 to 3 times the speed of the lower conveyor 26, but both such conveyors are moving in a forward direction. Thus, when the dough sheet 24 has its rear end lifted upwardly by the means 36, such rear end contacts against the conveyor belt 46 which starts to curl the same in a forward direction. Because of the speed differential between the upper and lower belts, the dough sheets 24 are thus rolled or curled into a completed Swiss Roll during their transit between the upper run 34 of the lower conveyor and the lower run 60 of the upper conveyor. The completed Swiss Rolls, designated 62, are then transferred onto any suitable type of support 64, which can be a table or some further conveying means.

If desired, the upper conveyor 44 can be made movable so that the same can be lifted out of position in order to facilitate cleaning or the like. Because of the fact that the curling of the sheets 24 occurs in a forward direction, simultaneously with movement of the sheets in a forward direction, no undesirable lateral or other forces or stresses are applied to the dough sheet and thus the deformation or tearing of the dough is eliminated.

After reading the foregoing detailed description, it should be apparent to those skilled in the art that the objects set forth at the outset of the specification have been successfully achieved by the present invention. However, changes in details and other modifications apparent to those skilled in the art may be made without departing from the spirit and scope of the invention as defined in the appended claims.

What is claimed is:

1. Apparatus for forming curled pastry products such as Swiss Rolls, said apparatus comprising:
    means for forming a plurality of discrete dough sheets having a creme coating on the upper surface thereof;
    means for supporting said sheets on their lower surfaces and for conveying said sheets forwardly;
    means for lifting the rear end of said sheets as said sheets are conveyed forwardly; and
    means for contacting said lifted rear ends of said sheets and for curling said sheets in a forward direction simultaneously with said forward conveying of said sheets.

2. Apparatus as defined in claim 1 wherein said means for supporting and conveying said sheets comprises a first endless conveyor belt.

3. Apparatus as defined in claim 2 wherein said means for contacting said lifted rear ends and for curling said sheets in a forward direction comprises a second endless conveyor belt disposed in spaced juxtaposition above said first endless belt.

4. Apparatus as defined in claim 3 wherein said second endless conveyor belt moves forwardly at a speed of 2.5 to 3 times the speed of said first endless conveyor belt.

5. Apparatus as defined in claim 3 wherein said means for lifting the rear end of said sheets comprises a rotatable member which rotates as the rear end of said sheet passes thereacross to lift said rear end upwardly to contact against second endless conveyor belt.

* * * * *